K. COTTRILL.
AUTOMOBILE SPEED CHANGING MECHANISM.
APPLICATION FILED NOV. 9, 1917.
1,313,881.
Patented Aug. 26, 1919.
3 SHEETS—SHEET 3.
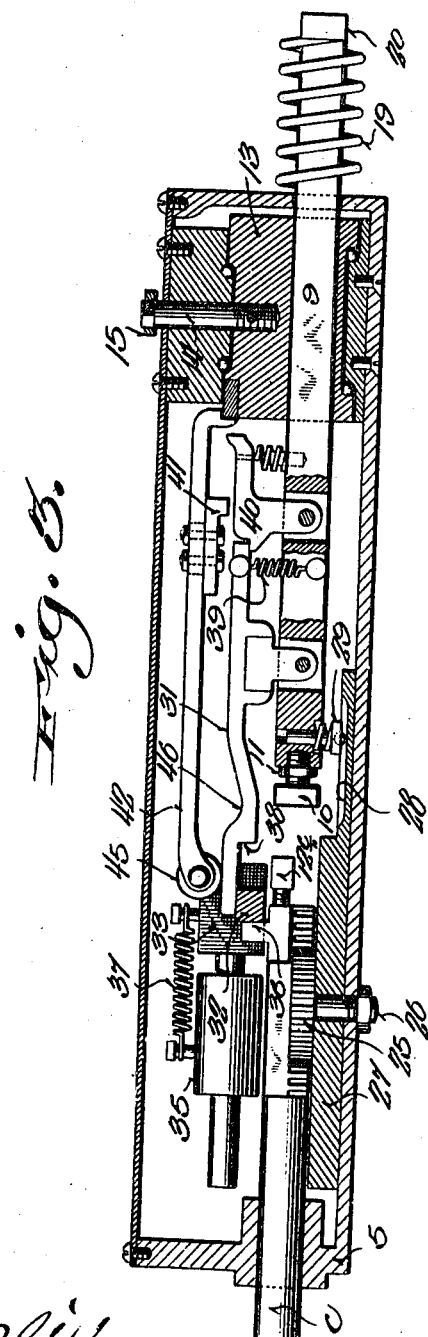
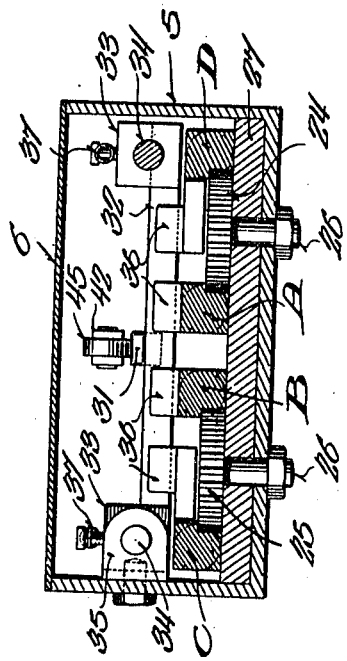

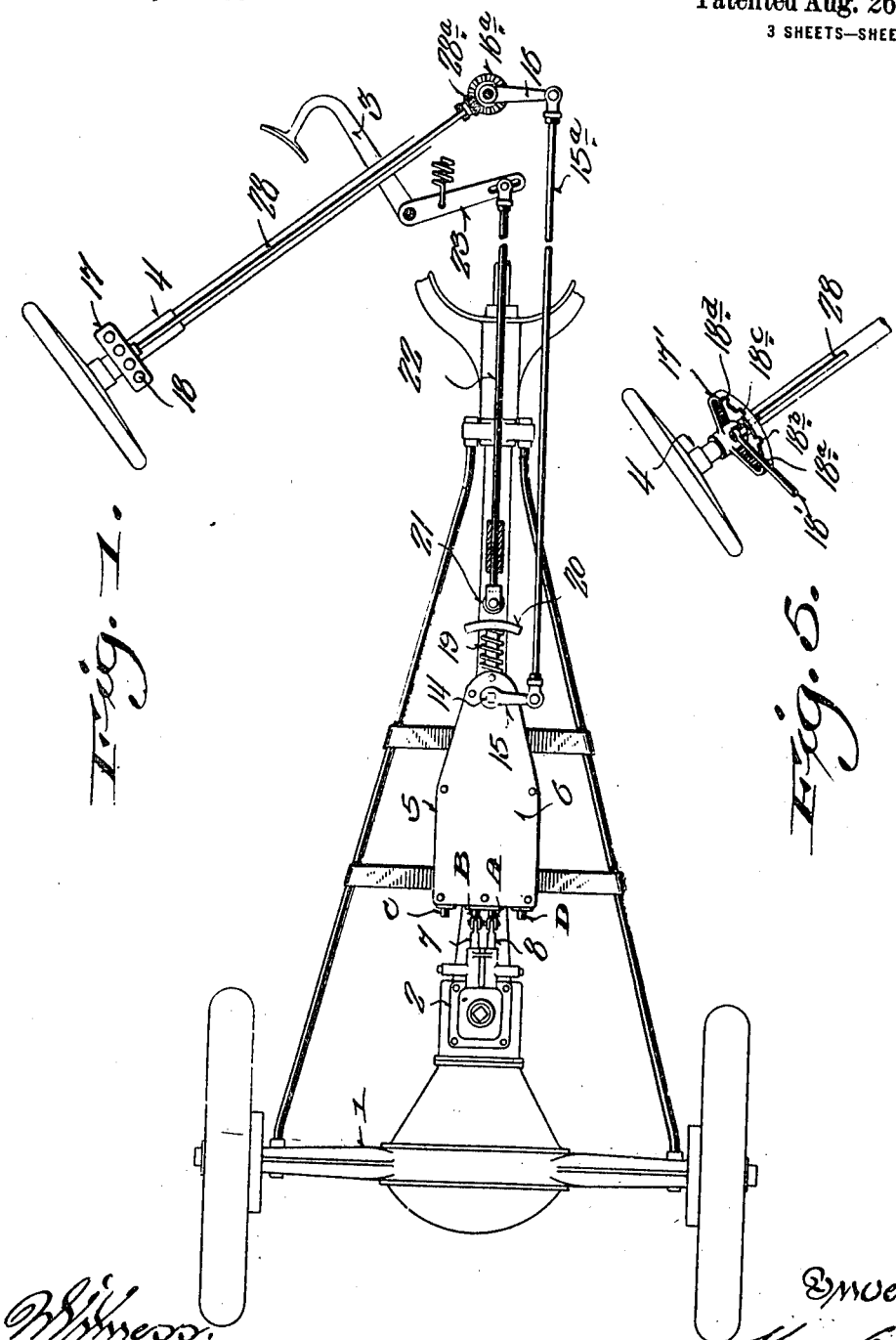

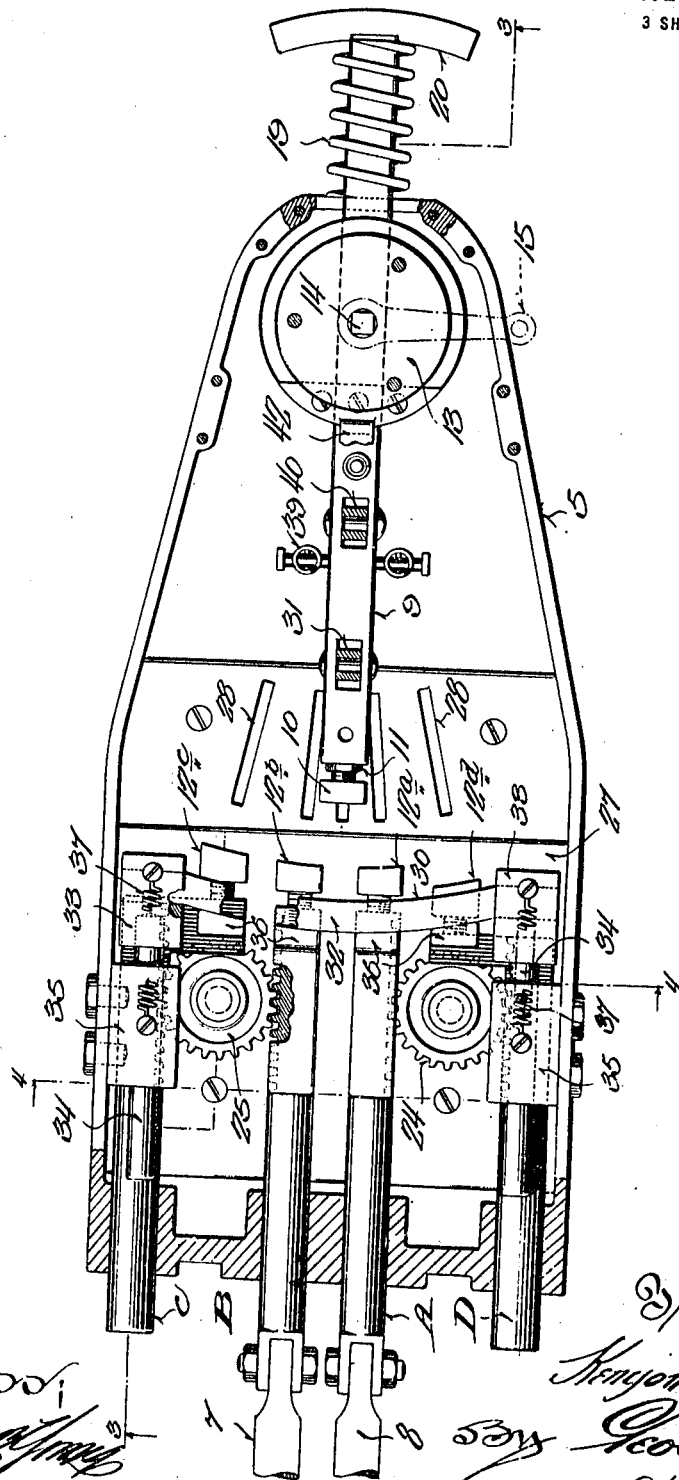

UNITED STATES PATENT OFFICE.

KENYON COTTRILL, OF FRESNO, CALIFORNIA, ASSIGNOR OF THREE-FOURTHS TO C. S. PIERCE, CARL A. LISENBY, AND R. J. WOODWARD, ALL OF FRESNO, CALIFORNIA.

AUTOMOBILE SPEED-CHANGING MECHANISM.

1,313,881. Specification of Letters Patent. Patented Aug. 26, 1919.

Application filed November 9, 1917. Serial No. 201,103.

*To all whom it may concern:*

Be it known that I, KENYON COTTRILL, a citizen of the United States, and resident of Fresno, in the county of Fresno and State of California, have invented certain new and useful Improvements in Automobile Speed-Changing Mechanism; and I do hereby declare that the following is a full, clear, and exact description thereof.

My invention refers to new and useful improvements in speed changing mechanism for selective gear transmission of automobiles and similar motor vehicles.

It is well known that with practically all motor vehicles at present on the market it is necessary to manually shift the gears of a selective gear transmission in changing from one speed to another after disengaging the clutch between the power plant and the transmission. The principal object of the present invention is to render this gear shifting substantially automatic, this being carried out substantially coincident with the movement of the clutch. Such an improvement will do away with the usual gear shifting lever and thus not only decrease the number of operations usually necessary but will also provide more room in the front part of the automobile.

Another object incidental to the principal object of the invention is to provide means for throwing the gears out of mesh preparatory to meshing other gears for changing the speed of the vehicle.

A still further object is to connect the shifting mechanism directly to the clutch operating mechanism whereby actuation of both will be practically simultaneous.

With these and other objects and advantages in view the invention resides in the novel features of construction, combination and arrangement of parts to be hereinafter more particularly described and claimed, and shown in the drawings wherein—

Figure 1 is a semi-diagrammatic view of portions of an automobile showing the relation of my invention to certain parts thereof;

Fig. 2 is a plan view of the shifting mechanism, certain parts of the casing and certain of the elements contained therein being in section;

Fig. 3 is a vertical longitudinal view taken substantially on the plane of the line 3—3 of Fig. 2;

Fig. 4 is a vertical transverse section on the plane of the line 4—4 of Fig 2;

Fig. 5 is a detailed view of one form of a combination of levers attached to the steering column for adjusting the member which engages the shifting rods.

Referring more particularly to the drawings, especially Fig. 1, it will be seen that my invention is designed to be associated with an automobile or other motor vehicle of conventional design which includes a rear axle 1 surrounded by a casing containing the usual differential, a gear case 2 containing the transmission gears, a clutch pedal 3 for operating the clutch, not shown, which connects the power plant with the rear axle transmission, and a steering post 4. The gear shifting mechanism is mainly disposed in a casing 5 which is provided with a removable cover 6, this casing being mounted adjacent the gear casing 2.

Inasmuch as the usual motor vehicle is provided with three speeds forward and one reverse, the present shifting mechanism is arranged to coöperate with the ordinary selective speed transmission contained within the gear case 2. Such transmission mechanism is controlled by a pair of rods 7 and 8 which extend outwardly of the gear case 2, these rods being pivoted to push rods A and B which are slidable through one wall of the casing 5. Movement of these push rods A and B in either direction will cause gears within the case 2 to be moved into or out of engagement with other gears to thereby vary the speed of the vehicle.

Also slidably mounted in the wall of the casing 5 are additional push rods C and D, the same being parallel to the first mentioned rods A and B and disposed on opposite sides thereof. At the opposite end of the casing 5 from these push rods is a longitudinally slidable selector bar 9 having a head 10 which is adjustable outwardly with respect thereto and is held in position by a lock nut 11, said head being designed to engage heads 12ª, 12ᵇ, 12ᶜ and 12ᵈ carried by the inner ends of the push rods A, B, C and D respectively. The selector bar 9 is slidable through a swiveled block 13, from which extends a pin 14, the outer end of the same projecting through the top 14, the outer end of the same projecting through the top 6 of the casing 5 where it is provided with a crank arm 15.

Movement of the crank arm 15 will obviously revolve the swiveled block 13 and thereby shift the inner end or head 10 of the selector bar so that it may be alined with any one of the heads 12 which are arranged on an arc, the center of which is the pivot of said block 13. This movement of the block 13 and the bar 9 is procured by any suitable means within the control of the operator of the vehicle, the means shown in the present instance consisting of an arrangement of rods and gears designated broadly as follows: The upper end of the steering post has a quadrant 17' mounted thereon in which there are a number of notches, indicated as $18^a$, $18^b$, $18^c$ and $18^d$, the number of said notches corresponding to the several speeds of the machine. 18' is a lever attached to the end of a rod 28 running parallel to the steering column. Lever 18, normally locks in either of the notches $18^a$, $18^b$, $18^c$ or $18^d$. The lower end of rod 28 has a pinion $28^a$ thereon which meshes with an arc $16^a$, pivoted to the frame of the vehicle or to the steering column. 16 is an arm attached to arc $16^a$. $15^a$ is a rod connecting crank arm 15 and arm 16. It will be noted that by a movement of lever 18' motion is transmitted to swivel block 13 which alines selector bar 9 with the heads $12^a$, $12^b$, $12^c$ or $12^d$. The relation of these several parts is such that when the hand lever 18 is in either notch the selector bar is alined with one of the push rods and locked in such position.

In Fig. 2 it will be noted that the head 10 of the selector bar 9 is normally spaced from all of the heads 12 of the push rods, and that it is only when these heads engage that the push rods are operated to shift the gears within the case 2. The bar 9 is retained in its retracted position as illustrated in the above figure by an expansile spring 19, one end of which bears against the casing 5 and the other end against an arcuate sector 20 formed on the free outer end thereof. This sector is adapted to be engaged by a roller 21 carried by the end of an actuating rod 22 which is slidable in suitable bearings on the frame of the vehicle. This rod 22 is in turn connected with a lever 23 which is operated by the movement of the clutch pedal 3. In other words, upon each movement of the clutch pedal 3 in a direction to disengage the clutch the selector bar will be moved inwardly to engage any one of the heads 12, the sector 20 being struck by the roller 21 regardless of whether the head 10 is alined with the head $12^a$ or $12^c$.

Again referring to the push-rods, it may be mentioned that the rod A when moved outwardly of the casing 5 will throw the gears within the case 2 into low speed, whereas movement of the rod in the reverse direction or inwardly will cause the reverse gears to be meshed. Movement of the push-rod B outwardly of the casing will cause the low speed gears to be thrown into engagement and when shifted in the opposite direction the gears will be in high speed. Inasmuch as it is not particularly feasible to move the push-rods A and B inwardly of the casing by direct engagement with the selector bar, the rods C and D have been provided, the same being connected to the other rods by a rack and pinion arrangement. That is to say the adjacent faces of the rods A and D and those of the rods B and C are provided with gear teeth which are continuously in mesh with pinions 24 and 25 respectively, these pinions being rotatably mounted on pivots 26 which are carried by a bed-plate 27 and the bottom of the casing 5. From this description it will be seen that whenever it is necessary to move the push rods A and B inwardly of the casing 5 to either throw the gears into reverse or into high speed the selector bar is moved to aline the head 10 with either of the heads $12^d$ or $12^c$, whereupon inward movement of the bar 9 will cause the push rod D to move outwardly, (or the rod C, if it is engaged,) and the rod A inwardly.

The bed-plate 27 is provided with a plurality of radially extending grooves 28 with which a detent 29 carried by the selector bar is adapted to engage. One of these grooves 28 is provided for each position into which it is necessary to move the selector bar. In other words when the head 10 of said bar is alined with the head $12^c$ the detent will be disposed in one groove, whereas when said head is alined with the head $12^d$ it will be in a second groove. This prevents the heads from moving out of alinement when the bar is shifted longitudinally by the action of the clutch pedal 3.

In addition to the foregoing elements means is also provided in the present invention for automatically disengaging all of the gears within the gear case 2 preparatory to meshing other gears therein. That is to say before the gears are moved into high speed the intermediate speed gears will be disengaged. This is carried out in a very simple manner by means of a retractor carriage 30 and a carriage engaging arm 31 pivoted to the selector bar 9. The carriage includes an arcuate bar 32 and bar-carrying blocks 33 with which are also associated guide-rods 34 slidably disposed in stationary guides 35, the latter being fixed to the walls of the casing 5. Thus the bar 32 extends across all of the push-rods and adjacent the heads thereof and each of said rods is provided with a shoulder 36 for coöperation therewith. Each adjacent block 33 and guide 35 is connected by a contracting coiled spring 37 to return the carriage, or particularly the bar 32 to its retracted position.

The carriage-engaging bar 31 is fulcrumed intermediate its ends, one end being shouldered as at 38 for engagement with the bar 32 and the other end is spring connected to the selector bar 9 by a contractile spring 39 whereby to tend to cause the shouldered end to move upwardly. A dog 40 also pivoted to the selector bar 9 is adapted to engage under one end of the carriage-engaging arm 31 to overcome the action of the spring 39. This dog is disengaged from the arm 31 by means of a tripper 41 which strikes one end of the same as the selector bar 9 is moved inwardly, this tripper being fixed upon a relatively stationary guide bar 42 which projects from the swiveled block 13 immediately above the path of movement of the bar 9.

The operation of the invention is substantially as follows: Assuming that it is desired to mesh the low speed gears in order that the vehicle may be driven at a low rate of movement and that the parts are arranged as shown in the drawings, the lever 18' is adjusted in the notch 18ᵃ to shift the selector bar, so that its head 10 will aline with the head 12ᵃ of the push-rod A, whereupon upon pressing the clutch pedal 3 to disengage the clutch the selector bar 9 will be moved longitudinally by the operation of the lever 23 and the rod 22, and the push-rod A moved outwardly of the casing. This movement of the push-rod A will naturally cause the push-rod D to move inwardly which movement will shift the carriage 30 because of the engagement of the shoulder 36 carried by the push rod D with the bar 32. Upon releasing the clutch pedal 3 the selector bar will be retracted, the clutch will be engaged and the vehicle permitted to proceed under the propulsion of its engine.

The next operation is to shift the selective speed mechanism from the low to the intermediate speed. Therefore the lever 18' is moved to notch 18ᵇ to swing the selector bar so that its head 10 will aline with the head 12ᵇ of the push-rod B, this movement being transmitted from the lever 18' through the rod 28, the arm 16 and the crank arm 15. Then the clutch pedal is again moved to disengage the clutch and simultaneously therewith to move the gears in the gear case 2 from low to intermediate speed relation, such being accomplished by engagement of the heads 10 and 12ᵇ and the outward movement of the rod B.

Before this change takes place, however, the low speed gears are moved out of mesh, this being accomplished by the engagement of the shoulder 38 of the carriage-engaging arm 31 with the bar 32, this engagement taking place before the heads 10 and 12ᵇ come in contact inasmuch as the shoulder 38 is disposed in advance of the head 10 as will appear from Fig. 3. The carriage is thereby shifted and the movement of the same to its normal position shown in Fig. 2 will obviously cause the bar 32 to engage the shoulder 36 of the push-rod D and move the latter outwardly, such movement revolving the pinion 24 and moving the push-rod A inwardly to its inactive position.

Previous to the engagement of the shoulder 38 with the bar 32 the tripper 41 will strike the end of the dog 40 to disengage the same from the carriage-engaging arm 31. Such will allow the spring 39 to exert its force to move the shouldered end thereof upwardly. However, a roller 45 on the end of the guide-bar 42 retains the arm 31 in substantially horizontal position until after it has performed its function, namely moving the carriage to normal position. Immediately after the purpose of the arm 31 is accomplished the shoulder 38 will be disengaged from the bar 32 inasmuch as the roller 45 will then be riding in a depression 46 in said arm 31 and the spring 39 will be active. Upon the return of the selector bar 9 to its retracted position, this being occasioned by the spring 19, the movement of the arm 31 beneath the roller 45 will return the former to its substantially horizontal position and allow the reëngagement of the dog 40 with the end thereof as in Fig. 3. The parts are thus automatically returned to a position so that they will be operative when the selector bar is again projected to shift the speed changing gears from intermediate to high or to any other desired speed. The carriage operates in the same manner regardless of which of the push-rods are moved, and the carriage engaging arm 31 will always return the carriage to its normal position and thus disengage all of the gears within the gear case.

From the foregoing description taken in connection with the accompanying drawings it will be seen that an extremely compact and simply constructed speed-changing mechanism has been produced. It is also evident that such mechanism can be readily mounted upon practically any motor vehicle of usual construction without changing the same materially. Any other forms of connections between the clutch pedal and the selector bar 9 may be provided as well as other means for shifting said selector bar to any one of its several positions.

I claim:

1. A mechanism of the class described comprising a pair of gear shifting elements, a pivoted longitudinally movable shifting element engaging member, said member being normally spaced from the shifting elements, means for moving said member about its fulcrum for selectively opposing the end of the same with either of said elements, and means for moving the member longitudinally when alined with one of said elements to shift the same.

2. A mechanism of the class described including a plurality of gear shifting elements, a rotary selection member, an actuating member slidably connected with said rotary selection member for rotation thereby, means for rotating said rotary selection member, and means for sliding the actuating member with respect thereto for engagement with a selected gear shifting element to shift said element.

3. A mechanism of the class described including a plurality of gear shifting elements, a pivoted longitudinally movable member, the pivotal movement of said member serving to place said member selectively in opposition to one of the gear shifting elements for procuring movement of the element upon longitudinal movement of said member, means for moving said member pivotally, means for moving the member longitudinally, and means independent of said longitudinal moving means for holding said member in a single direction of longitudinal movement upon the institution of longitudinal movement of said member in a predetermined direction.

4. A mechanism of the class described including a plurality of gear shifting elements, a pivoted longitudinally movable member provided with a transversely arcuate bearing surface substantially concentric with the pivotal axis of the member in normal position thereof, the pivotal movement of said member serving to place said member selectively in opposition to one of the gear shifting elements for procuring movement of the element upon longitudinal movement of said member, means for moving said member pivotally, means engaging said surface in various pivotal positions of the member for moving the member longitudinally, and means for holding said member in a single direction of longitudinal movement upon the institution of longitudinal movement of said member in a predetermined direction.

5. A mechanism of the class described including a plurality of gear shifting elements, a pivoted longitudinally movable member, the pivotal movement of said member serving to place said member selectively in opposition to one of the gear shifting elements for procuring movement of the element upon longitudinal movement of said member, means for moving said member pivotally, a plurality of guides extending radially between the pivotal axis of the element engaging member and the adjacent ends of the gear shifting elements, means on the element engaging member engageable with said guides during the major portion of the longitudinal movement of said member, and means for moving said member longitudinally.

6. A mechanism of the class described including a plurality of gear shifting elements, a pivoted longitudinally movable member provided with an arcuate bearing surface, the pivotal movement of said member serving to place said member selectively in opposition to one of the gear shifting elements for procuring movement of the element upon longitudinal movement of said member, means for moving said member pivotally, a plurality of guides extending radially between the pivotal axis of the element engaging member and the adjacent ends of the gear shifting elements, means on the element engaging member engageable with said guides during the major portion of the longitudinal movement of said member, means yieldably urging said member in longitudinal movement away from the gear shifting elements, and means for longitudinally moving the member, said means being engageable with said arcuate bearing surface of the member in various pivotal positions of the member.

7. A mechanism of the class described including a plurality of gear shifting elements, a pivoted longitudinally movable member, the pivotal movement of said member serving to place said member selectively in opposition to one of the gear shifting elements for procuring movement of the element upon longitudinal movement of said member, means for moving said member pivotally, means for moving the member longitudinally, a retractor engageable with said gear shifting elements and movable out of normal position upon movement of said members, and means carried by said element engaging member and engageable with said retractor during an initial portion of longitudinal movement of the element engaging member toward the retractor in various pivotal positions of said member.

8. A mechanism of the class described including a plurality of gear shifting elements, a pivoted longitudinally movable member, the pivotal movement of said member serving to place said member selectively in opposition to one of the gear shifting elements for procuring movement of the element upon longitudinal movement of said member, means for moving said member pivotally, means for moving said member longitudinally, a retractor engageable with said gear shifting elements and movable out of normal position upon movement of said elements, an abutting member pivoted on said element moving member and engageable with the retractor in various relative positions of said member to shift the retractor for placing the elements in neutral position, and means operable during an intermediate portion of longitudinal movement of the engaging member toward the elements for disengaging the retractor abutting member from the retractor.

9. The combination with a set of selective transmission gears and slidable transmission gear shifting rods associated therewith, of a pivoted longitudinally movable shift rod engaging member adapted upon pivotal movement for selective opposition to one of the rods to move said rod upon longitudinal movement of the member, means for pivotally moving said member including a radial arm attached thereto, a remote operating lever, a connection between said lever and radial arm, and independent means for moving the member longitudinally.

10. A mechanism of the class described including a plurality of gear shifting elements, a rotatable block, a bar carried by the block for sliding movement transversely of the axis of the block, rotation of the block serving to place the bar selectively in opposition to one of the gear shifting elements, means for rotating the block, and means for shifting the bar to procure shifting movement of the opposed gear shifting element.

11. A mechanism of the class described comprising a plurality of pairs of gear shifting elements movable in substantially parallel planes, the elements of each pair being simultaneously movable in opposite directions, each of said elements having a shoulder, a rectractor bar disposed across said elements and engageable with said shoulders, a shifting element engaging member adapted to be opposed to any one of said elements, means for moving the member to shift the element opposed thereto in one direction, the other element of the pair thereof moving in a reverse direction to dispose of the retractor bar out of normal position, said bar being disengaged from the shoulders of the other elements, and a retractor bar engaging arm carried on said shifting element engaging member for co-action with said retractor bar in various positions of the element engaging member relative thereto to return the same to normal position and into engagement with the shoulders of all of said elements.

12. A mechanism of the class described comprising a plurality of pairs of gear shifting elements movable in substantially parallel planes, the elements of each pair being simultaneously movable in opposite directions, each of said elements having a shoulder, a pair of relatively stationary tubular guides, a retractor including a bar disposed across said elements and engageable with said shoulders, a guide rod carried by each end of said bar and slidably disposed in said guides, a shifting element engaging member to be opposed to any one of said elements, means for moving the member to shift the element opposed thereto in one direction, the other element of the pair thereof moving in a reverse direction to dispose the retractor bar out of normal position, and a retractor bar engaging arm carried on the element engaging member and adapted in various relative positions of the element engaging member to contact with said retractor bar to return the same and all of the elements to normal position.

13. A mechanism of the class described comprising a plurality of pairs of gear shifting elements movable in substantially parallel planes, each element of each pair having a series of rack teeth formed on its inner face, a pinion disposed between each pair of elements and having its teeth engaged with the rack of the adjacent elements whereby the elements of each pair will be simultaneously movable in opposite directions, each of said elements having a shoulder, a retractor bar disposed across said elements and engageable with said shoulders, a shifting element engaging member to be opposed to any one of said elements, means for moving the member to shift the element opposed thereto in one direction, the other element of the pair thereof being movable in the opposite direction, its shoulder moving the retractor bar out of engagement with the shoulders of the other elements, and a retractor bar engaging arm carried on the element to contact with said retractor bar to return the same and the last mentioned element to normal position.

14. A mechanism of the class described comprising a plurality of gear shifting elements, a shifting element engaging member adapted to be opposed to any one of said elements, means for moving the member to shift the element opposed thereto in one direction, a second of said elements being simultaneously movable in a reverse direction, a retractor engageable with said elements and movable out of normal position by the shifting of said second element, a movable arm engageable with said retractor to return the same to normal position prior to the shifting of a third of said elements, a latch for holding said arm in position to engage said retractor, and a relatively stationary trip for disengaging the latch from the arm after the latter has moved a predetermined distance.

15. A mechanism of the class described comprising a plurality of gear shifting elements, a shifting element engaging member to be alined with any one of said elements, means for moving the member to shift the element alined therewith in one direction, a second of said elements being simultaneously movable in a reverse direction, a retractor engageable with said elements and movable out of normal position by the shifting of said second element, a movable arm engageable with said retractor to return the same to normal position prior to the shifting of a third of said elements, said arm having a recess therein, a latch for holding said arm in a position to engage said retractor, a relatively stationary guide bar having one end disposed in contact with said movable arm and adapted to ride into said recess when said latch is disengaged from said arm, and a trip carried by the guide bar to release the latch when the arm is moved a predetermined distance to permit the guide bar to engage in said recess, whereby to cause the disengagement of said arm and the retractor.

16. In a device for shifting selective transmission gears in a motor vehicle the combination of a transmission gear case, selective transmission gears journaled therein, parallel transmission gear shifting rods, adapted to actuate the transmission gears, a transmission gear shifting rod engaging member slidably pivoted to the transmission case, in such relation with the shifting rods that the engaging member can be opposed to the end of either one of the shifting rods, independent means for selectively opposing the shifting rod engaging member consisting of a radial arm connected therewith, a lever adjacent to the steering column near the steering wheel and means for transmitting the motion of the lever to the radial arm, and independent means for actuating the transmission rod engaging member, substantially as described.

In testimony that I claim the foregoing I have hereunto set my hand at Fresno, in the county of Fresno and State of California.

KENYON COTTRILL.

Witnesses:
   CLEO K. CURTIS,
   H. A. HUEBNER.